Aug. 1, 1933.          C. E. GREIDER          1,920,255
ELECTRODE FOR THERAPEUTIC ARC LAMPS
Filed May 22, 1930
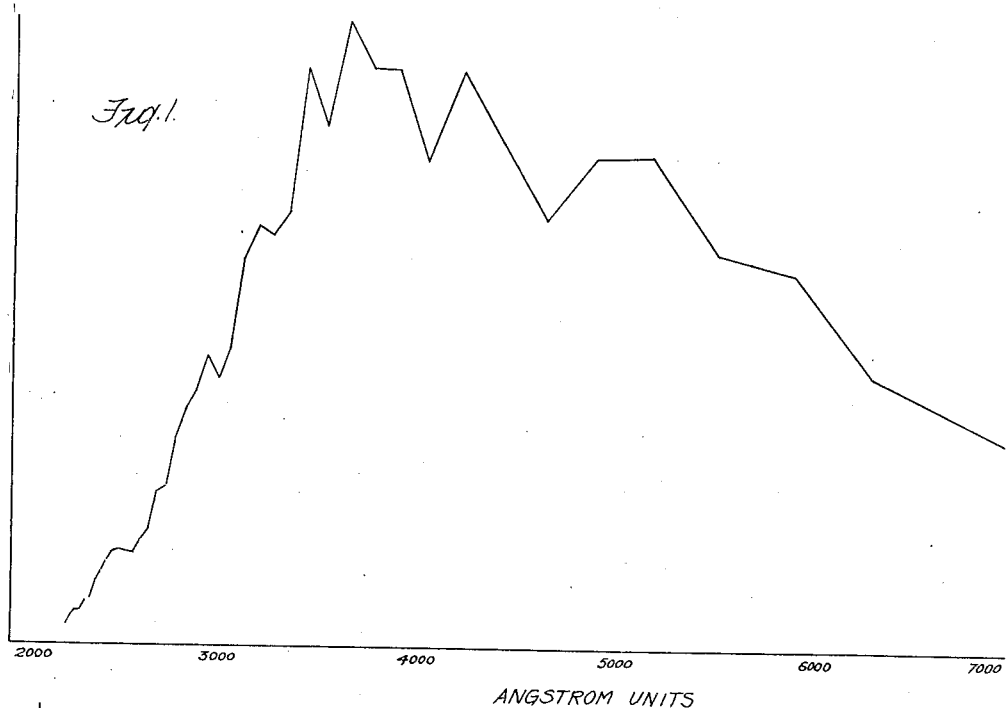
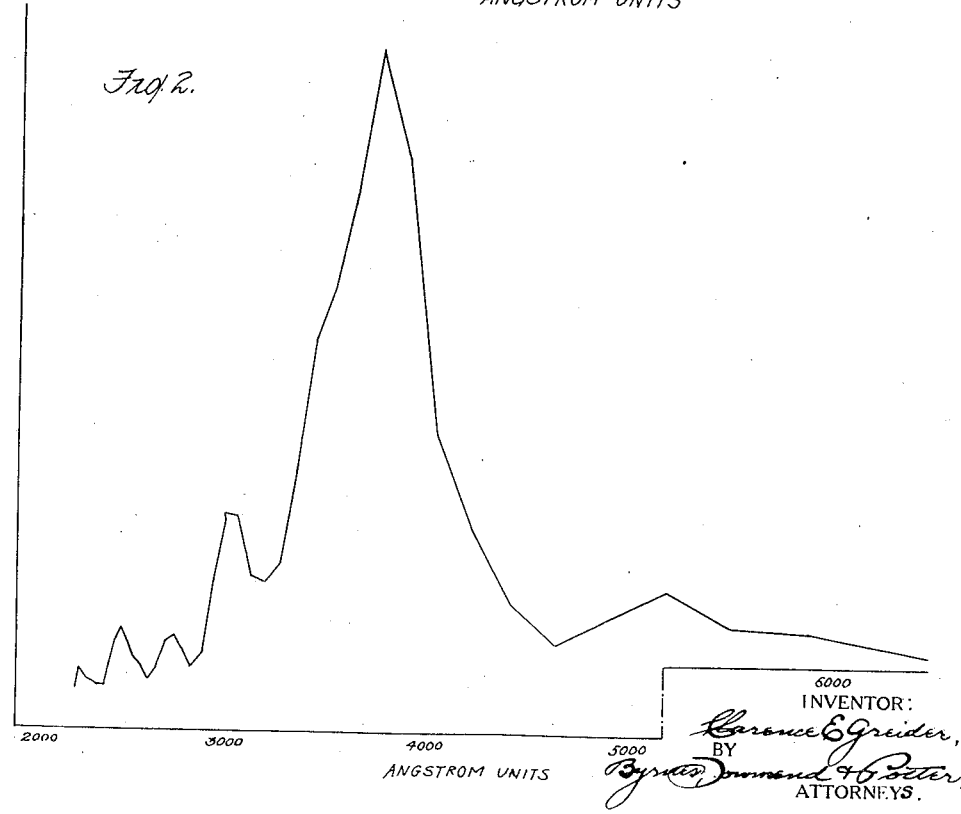

Patented Aug. 1, 1933

1,920,255

UNITED STATES PATENT OFFICE 1,920,255

ELECTRODE FOR THERAPEUTIC ARC LAMPS

Clarence E. Greider, Lakewood, Ohio, assignor to National Carbon Company, Inc., a Corporation of New York Application May 22, 1930. Serial No. 454,759

5 Claims. (Cl. 176—135.)

This invention relates to electrodes for arc lamps and especially to an electrode adapted for use in the treatment and prevention of diseases such, for example, as rickets. An object of my invention is to produce an electrode which will have a radiation rich in ultra-violet and especially in that region having a wave length shorter than 3100 A and especially between 2800 and 3100 A. The radiation between these wave lengths is considered to be important in the treatment of rickets and the band between 2400 and 3100 A is of importance therapeutically. While I have discovered a composition for an electrode which is of therapeutic value it is to be understood that I do not limit the use of my improved electrode to therapeutic purposes as it may be used as a source of light or ultra-violet radiation for other purposes. Another object of my invention is to devise a more efficient treatment for rickets than has been used heretofore. Other objects of my invention will be evident from the following specification having reference to the accompanying drawing in which Fig. 1 is a spectral energy distribution curve of an electrode constructed in accordance with my invention and Fig. 2 is a spectral energy distribution curve of an electrode containing nickel, aluminum and iron in the core, an electrode which has previously been considered the one of most efficient source of ultra-violet of these wave lengths.

While it has been known for some time that the arc between carbons containing iron in the core gives off a considerable amount of ultra-violet radiation of a wave length shorter than 3100 A, I have discovered that titanium, manganese and chromium give a radiation rich in ultra-violet of a wave length shorter than 3100, and that mixtures of two or more of them give a higher intensity than one alone. I may mix these in varying proportions but I have found that the best results are obtained when they are taken in substantially equal proportions. While I may use any two or any three of these metals I have found the best results are obtained when all four are used. However, whether two, three or four metals are used in the core they should be used in substantially equal proportions to give the best results. The metals may be used in metallic form or I may use oxides or salts. However, I prefer that the flame material should not exceed about 55% by weight of the core. By the use of the metals in metallic form it is possible to incorporate a larger amount than is the case when oxides or salts are used. However, the substitution of oxides for the metals improves the burning qualities of the carbon somewhat, although at the expense of a slight reduction in the ultra-violet intensity and an increase in the production of slag, causing a difficulty in starting the arc with carbons which have been used. If oxides or salts are used they are preferably used in such a proportion as to give equal quantities of metals although I have found that the use of equal quantities of oxides or salts causes only a slight reduction in the efficiency of the arc between the wave lengths of 2400 and 3100 A.

In constructing an electrode in accordance with my invention a hard carbon shell is formed and baked. Into this is inserted a core constructed in accordance with my invention; that is to say preferably containing about 55% of flame material with the remainder principally carbon and potassium silicate. The flame material consists of two or more of the metals titanium, manganese, chromium and iron. However, I prefer to use all four. Also I have found that the best results with a given number of metals were secured when they are in substantially equal proportions by weight. I may, of course, use oxides or salts of the above metals in equal proportions by weight or better yet in such proportions that the metal components may be in about equal proportions by weight. It is also, of course, within the scope of my invention to use alloys of these metals, the alloys being preferably in such proportions as to give approximately equal proportions of the respective metals. The core is forced into the shell and dried at a suitable temperature and is then ready for use in an arc lamp of any conventional type.

As an illustration of the effect of different core materials on ultra-violet intensity I give herewith some measurements taken with carbons having various flame materials in the core. The measurements were made by burning the electrodes in the same lamp under similar conditions as to voltage and amperage, length of the arc and the like. All electrodes contain about 55% flame material in the core. When more than one flame material was employed they were in equal parts by weight.

| Flame material | Ultra-violet intensity |
|---|---|
| Iron | 4.16 |
| Chromium | 3.91 |
| Manganese | 4.65 |
| Titanium | 3.97 |
| Iron, chromium | 5.25 |
| Iron, manganese | 5.00 |
| Iron, titanium | 4.87 |
| Chromium, manganese | 5.36 |
| Chromium, titanium | 5.86 |
| Manganese, titanium | 5.22 |
| Iron, chromium, manganese | 5.79 |
| Iron, chromium, titanium | 6.02 |
| Iron, manganese, titanium | 5.46 |
| Chromium, manganese, titanium | 6.37 |
| Iron, chromium, manganese, titanium | 6.60 |

These measurements were taken on the range of wave lengths between 2800 and 3100 A. The standard of comparison was an electrode containing rare earth fluorides in the core. The above data were secured by means of the screened cadmium photo-electric cell.

Similar tests have been made with varying proportions of the metals which indicate that the best results are obtained when the metals are present in about equal proportions. The series involving iron and manganese is given as typical and is as follows:

| Part iron | Part manganese | Ultraviolet intensity |
|---|---|---|
| 100 | 0 | 4.16 |
| 0 | 100 | 4.65 |
| 90 | 10 | 4.57 |
| 10 | 90 | 4.93 |
| 30 | 70 | 4.78 |
| 50 | 50 | 5.00 |

Vanadium might also be used with similar good results but I prefer not to use vanadium as the fumes are considered to be harmful.

From the above it will be seen that I have devised an electrode which is rich in ultra-violet radiation of the wave lengths considered to be of value in the prevention and treatment of rickets. From the curves shown in Figs. 1 and 2 it will be evident that this electrode has a radiation which is also strong in the region between 2400 and 2800 A which is also considered to be of therapeutic value.

I have also found that electrodes made in accordance with my invention have an energy distribution on wave lengths between 2500 and 3500 A which is much more regular than is the case with any electrodes heretofore proposed. Moreover, these electrodes give considerably more visual light than any electrodes rich in ultraviolet energy heretofore known.

I claim:

1. An electrode for arc lamps having a radiation rich in waves of lengths between about 2800 and 3100 A consisting of a cored carbon, the core of which contains flame material consisting of the metals iron, chromium, manganese and titanium in approximately equal proportions by weight.

2. A cored electrode for arc lamps, the core of which contains manganese, chromium and one of the metals titanium and iron, said metals being in substantially equal proportions by weight.

3. An electrode for arc lamps comprising a relatively hard carbon shell and a relatively soft core, said core comprising not more than substantially 55% flame material with the balance principally carbon and an alkaline silicate, said flame material comprising substances containing iron, chromium, manganese and titanium in such proportions that the metals are in substantially equal proportions by weight.

4. A cored electrode for arc lamps, the core of which comprises about 55% flame material, said flame material consisting of substantially 14% iron with the balance chromium, manganese and titanium.

5. An electrode for arc lamps adapted to produce an arc rich in radiation of wave lengths between about 2800 and 3100 A, consisting of a carbon having a core therein, said core containing as flame material two of the metals from the group consisting of iron, chromium, titanium and manganese, said metals being present in substantially equal proportions by weight.

CLARENCE E. GREIDER.